United States Patent [19]
Rudd

[11] 4,362,921
[45] Dec. 7, 1982

[54] WELDING OF FINS TO TUBING
[75] Inventor: Wallace C. Rudd, New Canaan, Conn.
[73] Assignee: Thermatool Corp., Stamford, Conn.
[21] Appl. No.: 207,467
[22] Filed: Nov. 17, 1980
[51] Int. Cl.³ .............................................. B23K 31/06
[52] U.S. Cl. .................................. 219/61.2; 219/67; 219/107
[58] Field of Search ........................ 219/61.2, 67, 107
[56] References Cited
U.S. PATENT DOCUMENTS

| | | | |
|---|---|---|---|
| 2,236,185 | 3/1941 | Murray | 219/107 |
| 2,809,276 | 10/1957 | Smith | 219/107 |
| 3,375,344 | 3/1968 | Kohler | 219/107 |
| 3,541,296 | 11/1970 | Rudd | 219/67 X |
| 3,588,426 | 6/1971 | Harriau | 219/107 |
| 3,999,029 | 12/1976 | Orr | 219/107 |
| 4,136,272 | 1/1979 | Rudd | 219/107 |

Primary Examiner—Elliot A. Goldberg
Attorney, Agent, or Firm—Brooks, Haidt, Haffner & Delahunty

[57] ABSTRACT

A method of manufacturing a solar panel element comprising a metal sheet or sheets secured to fluid-tight tubing substantially continuously along its length by metal which has been heated and cooled, e.g. weld metal, in which the tubing and the metal sheet or sheets are held in contact while they are heated to welding temperature, either forge welding or melting temperature. In the preferred methods, the heating is accomplished by high frequency, electric currents using a proximity conductor. Also, in the preferred methods, the tubing is formed with longitudinal lips as the heating is carried out, and the lips are secured together by welding them together simultaneously with the welding of the sheet or sheets to the tubing.

11 Claims, 16 Drawing Figures

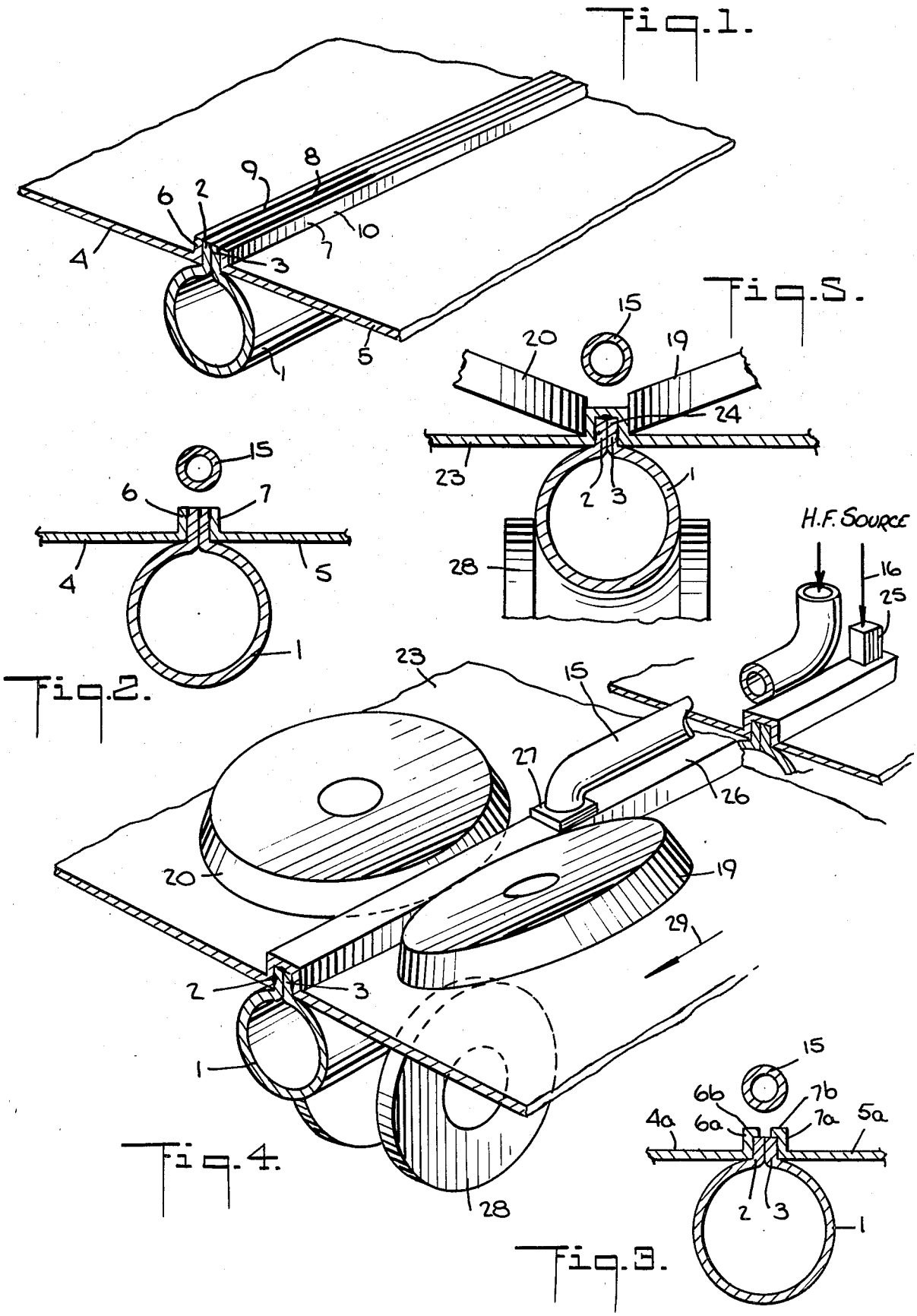

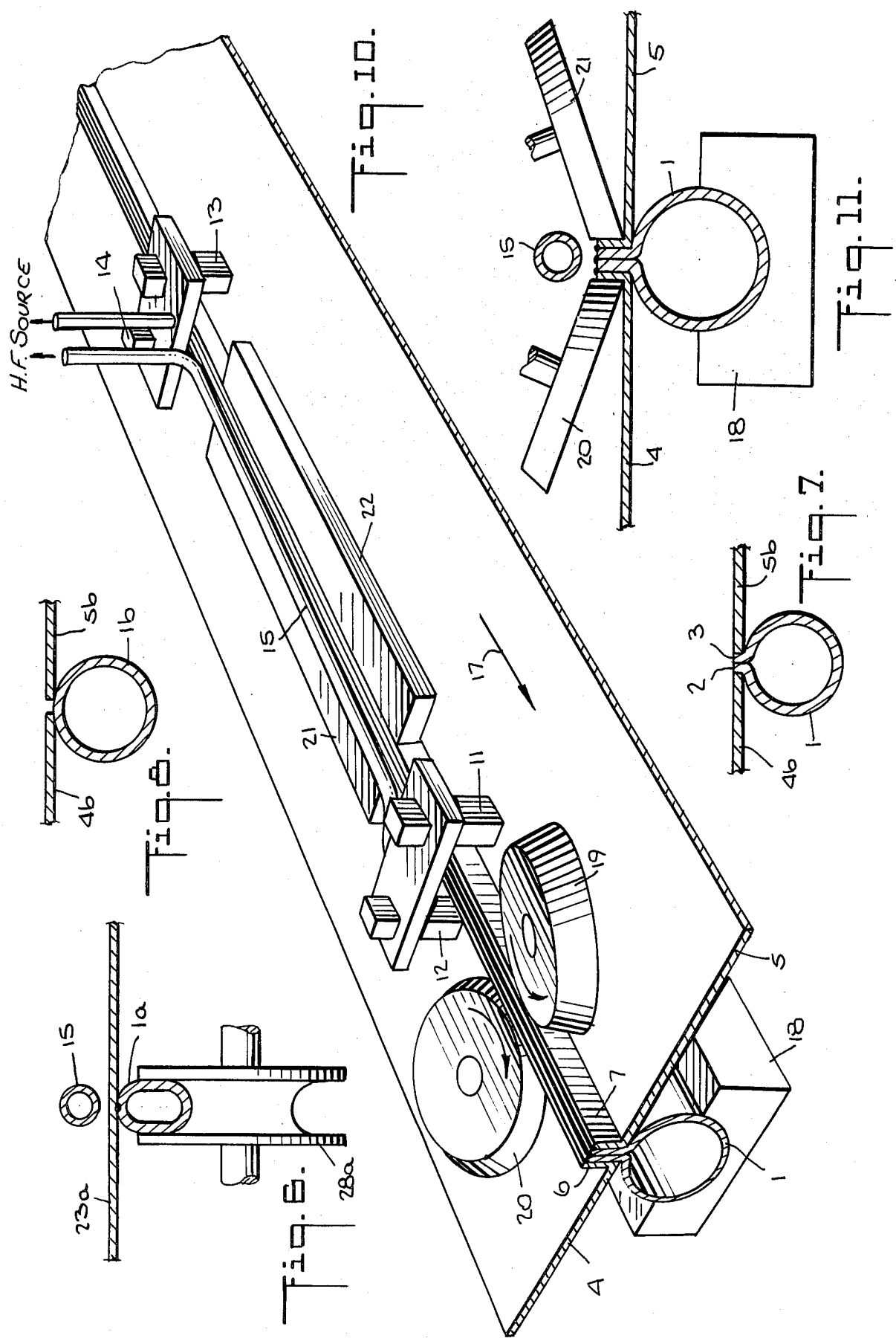

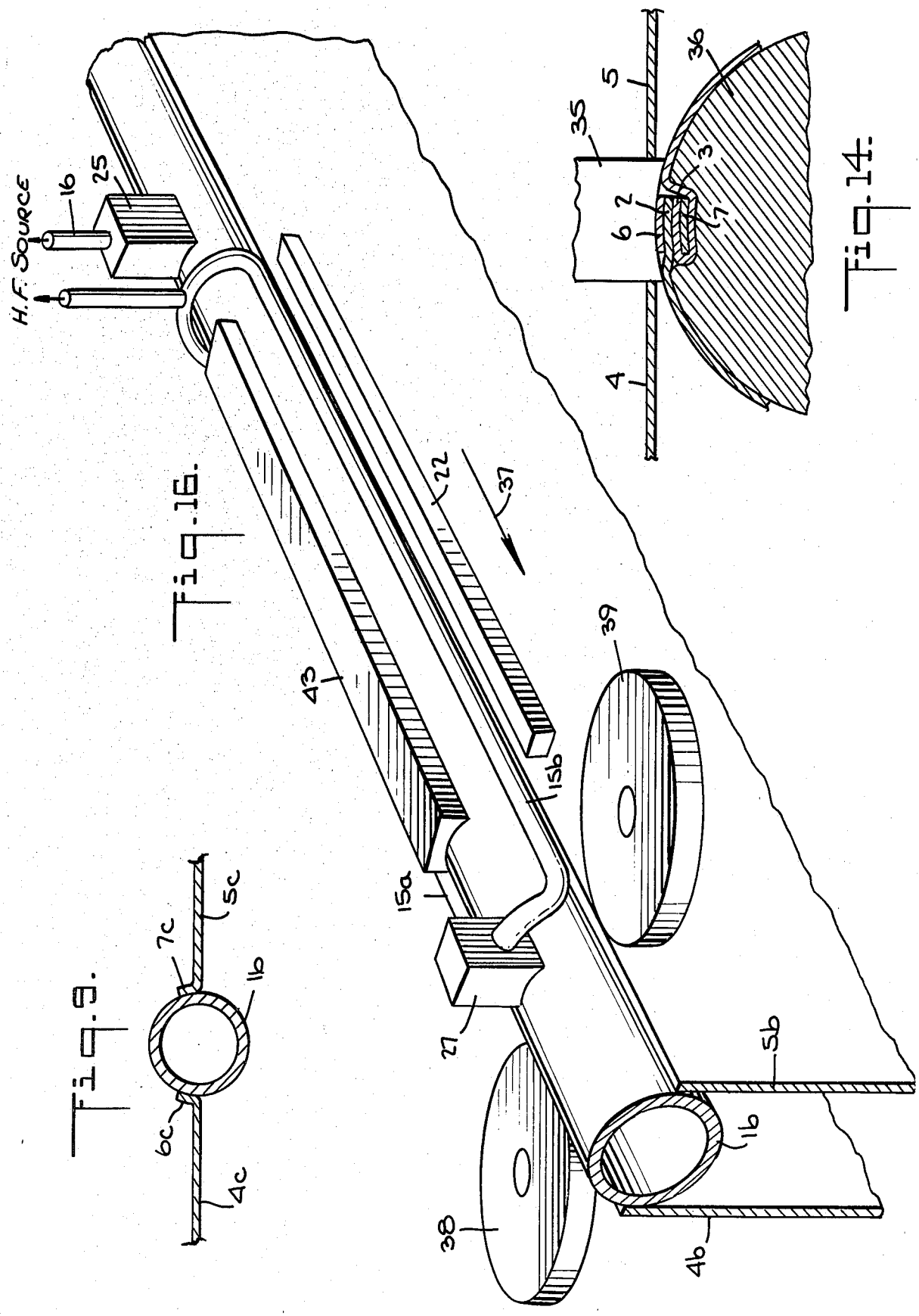

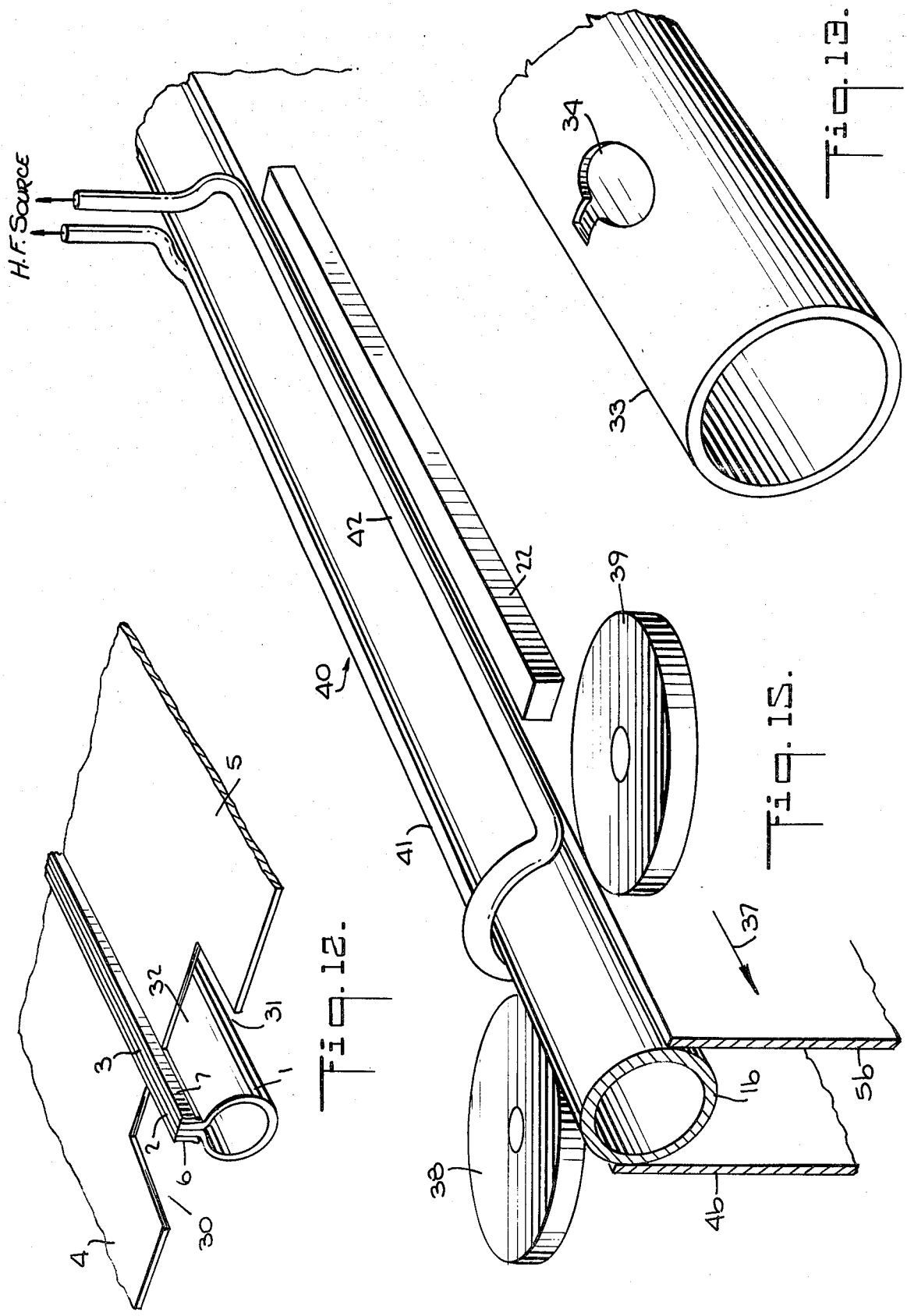

WELDING OF FINS TO TUBING

This invention relates to the manufacture of solar panel elements comprising metal tubing for conducting a fluid and a relatively thin metal sheet secured thereto in a manner which provides good heat conduction between the tubing and the metal. The tubing is usually secured to the sheet by metal, such as weld metal, brazing alloy or solder.

Methods for manufacturing heat exchanger panels, such as solar panels and panel elements, are disclosed in U.S. Pat. Nos. 4,112,566 and 4,136,272 and co-pending applications, Ser. No. 967,112 filed Dec. 7, 1978 and entitled High Frequency Current Welding of Metal Strip to a Metal Part; Ser. No. 113,790 filed Jan. 21, 1980 and entitled Heat Exchanger Panels and Method of Manufacture; Ser. No. 113,796 filed Jan. 21, 1980 and entitled Heat Exchanger Panels and Method of Manufacture and Ser. No. 122,467 filed Feb. 19, 1980 and entitled Methods and Apparatus for the Manufacture of Heat Exchanger Panels, said patents and applications being assigned to the assignee of this application. In the methods disclosed in said patents and said applications, the metal tubing is usually welded to the metal sheet using high frequency welding techniques in which the tubing and the sheet have a V-shaped gap therebetween in advance of the weld point.

As pointed out in said application, Ser. No. 967,112, the aforesaid welding techniques cause certain welding problems when the metal sheet is relatively thin which is the usual case when solar panels are being manufactured. Thus, if the correct paths for the tubing and the sheet as they approach the weld point are not carefully maintained, unsatisfactory welds can result.

In addition, in said prior art methods and in other prior art methods, the tubing is usually completely formed before it is welded to the sheet. Such tubing is often manufactured by forming a flat sheet into a tube and welding the sheet edges together where they meet. Accordingly, two welding stages are required, one to provide the tubing and the other to provide a heat exchanger element, and two such stages are undesirable not only from the manufacturing standpoint, but also from the standpoint of electrical energy required.

One object of the invention is to provide methods for making heat exchanger panel elements comprising metal tubing secured to metal sheet by welding which methods eliminate the problem of carefully controlling the paths of the tubing and the sheet as they approach the weld point with a V-shaped gap therebetween and as they are heated by high frequency electric currents.

Another object of the invention is to provide methods for making said heat exchanger panel elements in which welded, fluid-tight, metal tubing is formed at the same time that the tubing is welded to the metal sheet.

A further object of the invention is to provide novel solar panel element constructions which have certain advantages with respect to prior art solar panel element constructions.

In all the methods of the invention, the metal tubing, or the metal sheet which is to become the tubing, is pressed against the metal sheet which form the "fins" during the time that the tubing and sheet are joined to form a panel element, whereby it is unnecessary to maintain a carefully controlled spacing between the tubing and the sheet as they are joined together. Thus, in such methods, the metal of the tubing is pressed against the metal of the metal sheet or sheets which form the fins and the so-pressed together metals are joined, such as by electrical welding techniques or other techniques.

In some of the methods of the invention, the tubing is formed from a longitudinally folded metal sheet as the method is carried out. The metal of the fins is pressed against the metal of the folded metal sheet, and while so pressed together, the edges of the folded metal sheet are joined at the same time that the fins are joined to the tubing, such as by electrical welding techniques or other techniques.

Other objects and advantages of the present invention will be apparent from the following detailed description of the presently preferred embodiments thereof, which description should be considered in conjunction with the accompanying drawings in which:

FIG. 1 is a perspective view illustrating the joining of a pair of metal fins to lips on a metal sheet folded to form a tube at the same time that the lips are joined to form a fluid-tight tube;

FIG. 2 is a cross-sectional view of the embodiment of FIG. 1 with the addition of a proximity conductor which is used when the fins and the lips are welded with high frequency welding techniques;

FIG. 3 is similar to FIG. 2 but with a pair of metal fins formed so as to partially overlie the edge surfaces of the tubing lips;

FIG. 4 is a perspective view in which a single sheet of metal which provides the fins is centrally formed so as to overlie the edge surfaces of the lips of the folded metal sheet which provides the fluid-tight tubing;

FIG. 5 is a cross-sectional view of the embodiment shown in FIG. 4;

FIG. 6 is a cross-sectional view of an embodiment in which a flat metal sheet which provides the fins is welded at its central portion to metal tubing which has been completed in a separate, earlier step;

FIG. 7 is similar to FIGS. 1 and 2 but illustrates the joining of flat metal sheets at their edge surfaces to the lips of the metal tubing at the same time that the lips are joined together;

FIG. 8 is similar to FIG. 7 but illustrates simultaneous welding of two flat fins to metal tubing;

FIG. 9 is similar to FIG. 8 but illustrates the joining of formed metal sheets to the metal tubing at diametrically opposite portions of the latter;

FIG. 10 is a diagramatic perspective view of apparatus for the high frequency, electric welding of the embodiment illustrated in FIGS. 1 and 2;

FIG. 11 is an end view of the embodiment shown in FIG. 10;

FIG. 12 is a perspective view of the solar panel element shown in FIGS. 1, 2, 10 and 11 after it has been processed for connection to a header;

FIG. 13 is a perspective view of a portion of a header having an aperture for receiving the end of the panel shown in FIG. 12;

FIG. 14 is an end view of apparatus for modifying the embodiment shown in FIG. 12 so that the end thereof will fit into a circular aperture in a header;

FIG. 15 is a perspective view of apparatus for the high frequency electric welding of a further embodiment of the invention in which a pair of flat metal sheets are welded to previously completed tubing; and FIG. 16 is a perspective view of a modified form of the apparatus illustrated in FIG. 15.

FIGS. 1 and 2 illustrate a solar panel element construction in which a metal strip is formed by conventional roll forming equipment into a tubing 1 having abutting lips 2 and 3, and a pair of metal sheets 4 and 5, having bent edge portions 6 and 7 which mate with the lips 2 and 3, form fins at the sides of the tubing 1. The edge faces of the lips 2 and 3 are joined together in fluid-tight relation by metal 8 and the portions 6 and 7 are respectively joined by metal 9 and 10 to the lips 2 and 3. As is usual for solar panel elements, the sheets 4 and 5 are long and narrow, each sheet having its length extending in the length direction of the tubing 1, having a width larger than the cross-sectional dimension, or diameter, of the tubing 1 and having a thickness which is small relative to the cross-sectional dimension, or diameter of the tubing 1. The tubing 1 is secured to the sheets 4 and 5 intermediate the free, lateral side edges of the sheets 4 and 5. Normally, the sheets 4 and 5 are substantially flat at the portions thereof extending outwardly from the tubing 1, at least during the joining thereof to the tubing 1, and lie substantially in the same plane. However, such portions may be shaped, such as by corrugating them, after the sheets 4 and 5 are secured to the tubing 1.

The lips 2 and 3 may be joined with each other and the portions 6 and 7 may be joined to the lips 2 and 3 by brazing, soldering or welding, such as tungsten-inert gas, metal-inert gas, plasma, electron beam, laser, resistance or induction welding. However, in the preferred method of the invention, the lips 2 and 3 and the portions 6 and 7 are joined by means of electrical welding of the type described in U.S. Pat. No. 2,857,503 in which the parts to be welded are pressed together and as they are moved in the direction of the line of weld, electric current is supplied thereto by means of a pair of contacts spaced from each other in the direction of movement, one of the contacts being connected to the current source through a conductor, known as a "proximity" conductor, which overlies the weld line and extends from the latter contact to adjacent the other contact in close proximity to the weld line. FIGS. 10 and 11 illustrate diagramatically apparatus for electrical welding of the embodiment shown in FIGS. 1 and 2.

The apparatus illustrated in FIGS. 10 and 11 comprises a pair of downstream contacts 11 and 12 slidably engaging the surfaces of the sheets 5 and 4 respectively and a pair of upstream contacts 13 and 14 similarly engaging the sheets 5 and 4. Electric current having, for example, a frequency in the range from 10 KHZ to 500 KHZ is supplied from a current source respectively to the contacts 11 and 12 by way of a proximity conductor 15 close to and overlying the edge surfaces of the lips 2 and 3 and the portions 6 and 7 to the contacts 13 and 14 by a lead 16. Thus, as described in U.S. Pat. No. 2,857,503, the current flows in the lips 2 and 3 and the portions 6 and 7 between the upstream and downstream contacts and is concentrated at and below the edge surfaces of the lips 2 and 3 and of the portions 6 and 7 by the proximity conductor 15. Accordingly, the metal of both the sheets 4 and 5 and the tubing 1, where they are in contact, is heated to welding temperature.

As current is supplied to the sheets 4 and 5, and hence, to the lips 2 and 3 and the portions 6 and 7, the sheets 4 and 5 and the tubing 1 are moved in the direction of the arrow 17 by conventional means, and the tubing 1 is supported by a guide 18 which may, for example, be made of an insulating material, such as silicon nitride, which is resistant to high temperatures.

The lips 2 and 3 and the portions 6 and 7 are pressed together by a pair of squeeze rolls 19 and 20, and in advance of the contacts 11 and 12, they are pressed together by a pair of blocks 21 and 22 of high temperature insulating material, such as silicon nitride. Accordingly, during the time that the lips 2 and 3 and the portions 6 and 7 have current flowing therein and until they are pressed together at the squeeze rolls 19 and 20, the lips 2 and 3 and the portions 6 and 7 are pressed together which means that it is unnecessary to maintain any critical spacing between them.

The tubing 1 with the lips 2 and 3 and the sheets 4 and 5 with the bent-up portions 6 and 7 are formed from flat metal sheets in advance of the contacts 13 and 14, and preferably, they are continuously formed by conventional forming apparatus as they are advanced through the welding apparatus shown in FIGS. 10 and 11. In this way, flat sheets are continuously fed to the forming apparatus, and the formed sheets are continuously fed from the forming apparatus to the welding apparatus where a panel element comprising a fluid-tight, welded tubing 1 having fins 4 and 5 welded thereto is produced in a single welding operation.

The weld between the lips 2 and 3 and the portions 6 and 7 may be a forge weld or a melt weld by adjusting the welding conditions, i.e. the speed of advance of the tubing 1 and the sheets 4 and 5 and the magnitude of the welding current, in a known manner. When a forge weld is produced, the rolls 19 and 20 provide forge welding pressure, but when a melt weld in produced, the rolls 19 and 20 need to provide only the pressure required to hold the lips 2 and 3 and the portions 6 and 7 together during the cooling of the molten weld metal. In the case of melt welding, the weld metal will, of course, extend across the edge surfaces of the lips 2 and 3 and the portions 6 and 7 instead of in lines of weld metal 8, 9 and 10.

Since the edge surfaces of the lips 2 and 3 and the portions 6 and 7 are exposed and since the electric heating current flows on and below such edge surfaces by reason of the presence of the proximity conductor 15, all of such surfaces are heated by the current, and the frequency of the current is not critical. However, since proximity effect and hence, the concentration of the current at such edge surfaces, and since the depth of penetration of the current below such edge surfaces, is dependent on frequency, a current frequency of at least 10 KHZ is preferred.

FIG. 3 illustrates a modified form of the embodiment described in connection with FIGS. 1 and 2. In the embodiment shown in FIG. 3, edge portions 6a and 7a of the sheets 4a and 5a are provided with two bends in conventional roll forming apparatus so that portions 6a and 7a not only bear against the side surfaces of the lips 2 and 3, but also partially overlie the edge surfaces of the lips 2 and 3. The sheets 4a and 5a may be secured to the tubing 1 in the manner described in connection with FIGS. 1 and 2 except that melt welding would be used, i.e. the welding conditions would be such that at least the portions 6b and 7b of sheets 4a and 5a which overlie the edge surfaces of the lips 2 and 3 as well as portions of the lips 2 and 3 melt. When the welding is performed with the apparatus described in connection with FIGS. 10 and 11, the portions 6b and 7b which overlie the edge surfaces of the lips 2 and 3 would melt first and supply extra molten metal, as compared to the embodiment shown in FIGS. 1 and 2, to the welding area but will progressively melt in a direction away from the edge surfaces thereof so as to aid in confining the molten metal to the top of the edge surfaces of the lips 1 and 2.

Another embodiment of the invention in which fins are welded to tubing at the same time that the tubing is welded is illustrated in FIGS. 4 and 5. In this embodiment, a single metal sheet 23, which is, in effect, a combination of sheets 4 and 5 or 4a and 5a, is formed by conventional roll forming means with a longitudinally central channel 24 with side walls and a bottom wall which engage, respectively, the side surfaces and the edge surfaces of the lips 2 and 3, although only contact between the bottom wall of the channel 24 and the edge surfaces of the lips 2 and 3 is necessary.

The sheet 23 could be welded to the tubing 1 in the embodiment illustrated in FIGS. 4 and 5 by the various other welding techniques mentioned hereinbefore, but because of difficulties in obtaining a good weld between the wall of the channel 24 and the lips 2 and 3, a good weld requiring that both the channel wall and portions of the lips 2 and 3 reach welding temperature, using such other welding techniques, it is preferred that current penetration, welding techniques described in U.S. Pat. No. 3,591,757 be used to weld the sheet 23 to the tubing 1. FIG. 4 illustrates diagramatically one form of apparatus which may be used for the welding, such apparatus being similar to the apparatus shown in FIG. 10 and described in connection therewith.

The apparatus illustrated in FIG. 4 comprises rolls 19 and 20 for pressing the side walls of the channel 24 against the side surfaces of the lips 2 and 3 and for pressing the lips 2 and 3 together. An upstream contact 25 bears against the outer surface 26 of the bottom wall of the channel 24 and a downstream contact 27 bears against the surface 26. The contacts 25 and 27 may be replaced, respectively, by the contacts 13 and 14 and the contacts 11 and 12 disposed as shown in FIG. 10, but preferably, they engage the surface 26 so as to press the bottom wall of the channel 24 against the edge surfaces of the lips 1 and 2, the purpose being to provide good conductive contact between such wall and such surfaces. However, means other than the contacts, such as blocks or rollers made of a high temperature insulating material, may be employed instead of, or in addition to, the contacts 25 and 27 to press such wall against such edge surfaces. The tubing 1 is supported by one or more rollers 28.

Electric heating current of a selected frequency is supplied from a high frequency source to the contacts 25 and 27 by way of the proximity conductor 15 and the lead 16. While current is supplied to the contacts 25 and 27, the tubing 1 and the sheet 23 are moved in the direction of the arrow 29, so that at least the bottom wall of the channel 24 and at least the edge surfaces of the lips 2 and 3 reach welding temperature, either forge welding or melting temperature, by the time they reach the nip of the rolls 19 and 20. If the bottom wall of the channel 24 and the lips 2 and 3 are to be forge welded, the rolls 19 and 20 may be provided with lips (not shown) which bear against the surface 26 and press such bottom wall against the lips 2 and 3 or a separate roller of high temperature resistant material may press against the surface 26 above the nip of the rollers 19 and 20.

The temperature which the bottom wall of the channel 24 and the lips 2 and 3 reach when they reach the nip of the rollers 19 and 20 depends, as is known, on the speed of advance of the tubing 1 and the sheet 23 and the magnitude of the current. Such temperature, especially the temperature of the lips 2 and 3, is also dependent upon the frequency of the current. Thus, as explained in said U.S. Pat. No. 3,591,757, the depth of metal in which about 86% of the current will flow depends on the reference depth of the current, and the reference depth decreases with increases in frequency. If the reference depth is too small, the bottom wall of the channel 24 will overheat before the lips 2 and 3 reach welding temperature. Therefore, the frequency of the heating current must be selected so that the reference depth is greater than the thickness of such bottom wall if current is to flow in the lips 2 and 3. The rules for selecting the correct frequency are set forth in said U.S. Pat. No. 3,591,757, but generally speaking, the exact frequency is determined empirically and is dependent on the conditions employed, e.g. speed of advance, source current capacity, etc. For example, if the sheet 23 is made of copper and has a thickness of about 0.010 inches a frequency of 10 KHZ may be used with certain conditions, and the frequency may be higher if the sheet 23 is thinner.

FIG. 6 illustrates an embodiment of the invention in which a flat sheet 23a, without the channel 24 therein, is joined at its longitudinally central portion to a previously manufactured tubing 1a. Preferably, the sheet 23a and the tubing 1a are welded together with the methods and apparatus described in connection with FIGS. 4 and 5. Preferably, also, the tubing 1a is shaped as shown in FIG. 6 and the roller 28a has a groove with walls which closely fit the tubing 1a so as to prevent collapse of the tubing 1a when the sheet 23a is pressed thereagainst the tubing 1a, particularly when forge welding and forge welding pressure is used.

FIG. 7 illustrates a further embodiment of the invention, similar to the embodiment described in connection with FIGS. 1 and 2, in which sheets 4b and 5b, without the bent portions 6 and 7, are welded at their edge surfaces to the lips 2 and 3 of the tubing 1, at the same time as the lips 2 and 3 are welded together, preferably, in the manner described in connection with FIGS. 1 and 2.

FIG. 8 illustrates a further embodiment of the invention in which the sheets 4b and 5b are welded to a previously manufactured tubing 1b, preferably in the manner described in connection with FIGS. 1 and 2.

FIG. 9 illustrates a further embodiment of the invention in which sheets 4c and 5c having bent-up portions 6c and 7c are welded to a previously manufactured tube 1b close to diametrically opposite portions of the tubing 1b. Preferably, the sheets 4c and 5c are welded to the tube 1b in the manner described hereinafter in connection with FIG. 15 or FIG. 16.

After a long length of tubing sheet combination is made, it may be cut into solar panel lengths, as described in said application Ser. No. 122,467 and the lengths may be further processed as described in said applications, Ser. Nos. 122,468, 113,790 or 113,796. Such processing involves cutting away of portions of the sheet or fins adjacent the tubing ends, and if the tubing is circular in cross-section, the panels may be joined with headers having circular openings in an obvious manner. However, if the tubing is non-circular, e.g. see FIGS. 2, 3, 5 and 7, because of the lips 2 and 3, the shape of the openings in the headers may correspond to the cross-section of the ends of the tubing or at least the exposed ends of the tubing may be further processed so as to fit into circular openings in the headers.

FIG. 12 illustrates one of the ends of a panel made from the tubing-sheet combination described in connection with FIGS. 1 and 2 with portions of the sheets 4 and 5 cut away, as at 30 and 31, to expose an end portion 32 of the tubing 1 for insertion into an opening 34 in a header 33 (FIG. 13), the opening 34 having a shape corresponding to the shape of the portion 32.

While methods and apparatus for punching an opening 34 of a key-hole shape are known in the art, it may be preferable to further process the portion 32 so that it will fit into a circular opening in a header. If so, the lips 2 and 3 and the portions 6 and 7 may be rolled down, as illustrated in FIG. 14, by a pressure roller 35 while the portion 32 is supported by a mandrel 36 having a groove for receiving the rolled down lips 2 and 3 and the portions 6 and 7.

Of course, in lieu of cutting away portions of the sheets at 30 and 31, nipples may be secured in fluid-tight relation to the cut ends of the tubing 1, 1a, 1b, etc., and such nipples may be inserted in openings in a header.

In the embodiments illustrated in FIGS. 8 and 9, the sheets 4b and 5b and the sheets 4c and 5c, respectively, are in the same plane as they are welded to the tubing 1b. In FIG. 8, the plane of the sheets 4b and 5b is substantially tangent to the outer surface of the tubing 1b, and in FIG. 9, the plane of the sheets 4c and 5c is substantially co-planar with a diametrical plane of the tubing 1b.

As illustrated in FIGS. 15 and 16, the sheets 4b and 5b may be in different planes, each of which is tangent to the outer surface of the tubing 1b, while the sheets 4b and 5b are welded to the tubing 1b, and after the sheets 4b and 5b are welded to the tubing 1b, the sheets 4b and 5b may be bent into the same plane, if desired, to provide a structure similar to the structure illustrated in FIG. 9. This method may be advantageous, particularly when forge welding is used, because of the fact that with the structure shown in FIG. 7 and possibly FIGS. 8 and 9, it may be difficult to apply sufficient welding pressure directed in the plane of the sheets, the sheets being relatively thin. However, with the structure shown in FIGS. 15 and 16, as well as the structure shown in FIG. 9, the areas of contact between one sheet, 4b or 4c, and the tubing 1b and between the other sheet, 5b or 5c, and the tubing 1b are relatively widely separated. Accordingly, the apparatus illustrated in and described in connection with FIGS. 4 and 10 would either concentrate the heating current between the two areas of contact or concentrate the heating current at one area of contact, the latter requiring two welding passes to weld both sheets to the tubing. Both of these results are undesirable.

FIG. 15 illustrates one form of apparatus for simultaneously heating the area of contact between the sheet 4b and the tubing 1b and the area of contact between the sheet 5b and the tubing 1b as the sheets 4b and 5b and the tubing 1b are advanced in the direction of the arrow 37. As they are advanced, the sheet 5b is pressed against the tubing 1b by a bar 22 of high temperature insulating material and the sheet 4b is pressed against the tubing 1b by a similar bar 21 (not visible in FIG. 15). The areas of contact between the sheets 4b and 5b and the tubing 1b reach welding temperature, either forge or melt welding temperature, by the time they are between the rollers 38 and 39, and are pressed together by the rollers 38 and 39. Heating current is caused to flow at the areas of contact by a single-turn, induction coil 40 connected to a high frequency source. One leg 41 of the coil 40 overlies the area and contact between the sheet 4b and the tubing 1b and concentrates the heating current in such area, and another leg 42 overlies the other area of contact between the sheet 5b and the tubing 1b and concentrates the heating current in such other area, in a well-known manner. If desired, the tubing 1b may be shaped as shown in FIG. 6 with the long axis extending between the sheets 4b and 5b to aid in preventing crushing of the tubing 1b by the rollers 38 and 39, and a bar of magnetic material may be placed on the tube 1b between the legs 41 and 42, to aid in concentrating the current at the areas of contact.

Accordingly, with the apparatus illustrated in FIG. 15, the heating current is concentrated in two separated areas and two lines of weld are produced simultaneously. Also, pressure is applied at the weld points by two rollers 38 and 39 only in the direction of the thickness of the sheets 4b and 5b.

Another form of apparatus, similar to the apparatus shown in FIG. 15 but using contacts 25 and 27 to supply the heating current to the parts instead of an induction coil, is illustrated in FIG. 16. In the apparatus illustrated in FIG. 16, the high frequency current source is connected to the tubing 1b by the lead 16 and the upstream contact 25, such contact 25 being in sliding engagement with the tubing 1b, and is also connected to the tubing 1b by way of a split proximity conductor having two legs 15a and 15b and a downstream contact 27 in sliding engagement with the tubing 1b. The legs 15a and 15b concentrate the heating current at the areas of contact between the sheets 4b and 5b and the tubing 1b. If desired and to further aid in concentrating the current in the areas of contact, a bar 43 of magnetic material, capable of withstanding the temperatures involved, may be placed as shown in FIG. 16 in close relation to the upper surface of the tubing 1b. The operation of the apparatus shown in FIG. 16 is otherwise the same as the operation of the apparatus shown in FIG. 15, and the results are similar.

Although lower frequencies could be used with the welding apparatus shown in FIGS. 15 and 16, the dimensions and materials usually involved in the manufacture of solar panels make it desirable, for electrical reasons, to use frequencies of at least 300 KHZ and preferably, in the range from 400 KHZ to 500 KHZ.

With the high frequency electric welding techniques described, the tubing-sheet constructions illustrated in FIGS. 1-4 are particularly advantageous because a high concentration of current can be obtained where the welding is to be performed because of the configuration of the parts. Such concentration is desirable from the standpoint of enery required and from the standpoint of current generator capacity required. Furthermore, such concentration permits relatively high welding speeds.

However, the various embodiments described also permit the use of relatively low welding speeds, e.g. of the order of 5-30 feet per minute, which may be desirable for other purposes, such as the cutting of the tubing-sheet combination into panel lengths as the combination leaves the welding station.

What is claimed is:

1. A method of manufacturing a panel element comprising fluid-tight, metal tubing secured along its length to metal sheet or sheets by metal which has been heated and cooled, said metal sheet or sheets being long and narrow, having the length thereof extending in the length direction of the tubing, having a width larger than the cross-sectional size of the tubing, and having a thickness which is small relative to the cross-sectional size of the tubing, said tubing being secured to the sheet or sheets intermediate lateral side edges of the sheet or sheets, said method comprising:

forming said tubing with a pair of abutting lips which extend radially outwardly from the tubing;

pressing the metal sheet or sheets into contact with said lips with lateral side edges of the metal sheet or sheets spaced from the tubing;

by heating means, heating the metal of both said lips and said sheet or sheets to welding temperature at least where they are in contact;

maintaining the pressing of the sheet or sheets against the lips when the metal thereof reaches welding temperature to cause the lips to become welded together and to cause the sheet or sheets to become welded to the lips; and producing relative movement between the heating means, on the one hand, and the tubing and the sheet or sheets, on the other hand, in a direction longitudinally of the tubing and during the heating of the contacting metal of the tubing and the sheet or sheets to provide a substantially continuous weld between the tubing and the sheet or sheets which extends longitudinally of the tubing.

2. A method as set forth in claim 1 wherein the heating of the metal is carried out by supplying high frequency, electric current to the contacting metal of the sheet or sheets and the tubing by means of contacts engaging one of said tubing and said metal sheet or sheets adjacent the contacting metal and spaced apart in the direction longitudinally of said tubing, the current being supplied to one of said contacts by way of a proximity conductor overlying the contacting metal in closely spaced relation to the tubing and the metal sheet or sheets.

3. A method as set forth in claim 1 or 2 wherein the contacting metal of the tubing and the sheet or sheets is heated to a forge welding temperature and the sheet or sheets are pressed together with forge welding pressure after the contacting metal reaches welding temperature.

4. A method as set forth in claim 1 or 2 wherein the contacting metal of the tubing and the sheet or sheets is heated to the melting temperature thereof.

5. A method as set forth in claim 1 wherein a pair of metal sheets are welded to the metal tubing and further comprising forming each of said sheets at one lateral side edge, prior to the heating, to provide an edge portion which extends at an angle to the remainder of the sheet and which mates with the lips of the tubing, wherein the edge portion of one of said sheets is pressed into contact with one of said lips and the edge portion of the other of said sheets is pressed into contact with the other of said lips prior to the heating and both the edge portions of said sheets and said lips are heated to welding temperature.

6. A method as set forth in claim 1 wherein a single metal sheet is welded intermediate its lateral edges to said lips and further comprising forming a portion of said sheet, prior to the heating, with a longitudinally extending channel intermediate the lateral edges of the sheet which has a shape, in cross-section, which permits entry of the lips of the tubing therein with at least one wall of the channel engaging said lips and wherein, said wall of said channel is pressed into contact with said lips prior to the heating and both said wall of said channel and said lips are heated to welding temperature.

7. A method as set forth in claims 1, 5 or 6 wherein the heating of the metal is carried out by supplying high frequency, electric current to the contacting metal by means of contacts engaging one of said tubing and said metal sheet or sheets adjacent the contacting metal and spaced apart in the direction longitudinally of said tubing, the current being supplied to one of said contacts by way of a proximity conductor overlying the contacting metal and in closely spaced relation to said lips and the metal sheet or sheets.

8. A method of manufacturing a solar panel element comprising fluid-tight, metal tubing secured along its length to metal sheets by metal which has been heated and cooled, said metal sheets being long and narrow, having the length thereof extending in the length direction of the tubing, having a width larger than the cross-sectional size of the tubing, and having a thickness which is small relative to the cross-sectional size of the tubing, said tubing being secured to lateral side edges of the sheets, said method comprising:

forming said tubing with a pair of abutting lips which extend radially outwardly from the tubing;

pressing the metal sheets at one of their respective lateral side edges into contact with said lips;

by heating means, producing heated metal at the abutting surfaces of the lips and at the surfaces of contact between the lips and the sheets;

maintaining the pressing of the sheets against the lips as the heated metal is produced; and producing relative movement between the heating means, on the one hand, and the tubing and the sheets, on the other hand, in a direction longitudinally of the tubing during the production of the heated metal to provide a continuous metal bond both between the lips and between the lips and the sheets after the metal which was heated has cooled.

9. A method as set forth in claim 8 further comprising forming each of said sheets at its said one of its lateral side edge, prior to the production of the heated metal, to provide an edge portion which extends at an angle to the remainder of the sheet and which mates with the lips of the tubing, and wherein the edge portion of one of said sheets is pressed into contact with one of said lips and the edge portion of the other of said sheets is pressed into contact with the other of said lips prior to the production of the heated metal.

10. A method as set forth in claim 8 or 9 wherein the heated metal is produced by supplying high frequency, electric current to the contacting metal of the sheets and the tubing by means of contacts engaging one of said tubing and said metal sheets adjacent the contacting metal and spaced apart in the direction longitudinally of said tubing, the current being supplied to one of said contacts by way of a proximity conductor overlying the contacting metal in closely spaced relation to the tubing and the metal sheets.

11. A method as set forth in claim 8 or 9 wherein the heated metal is produced by melting metal and depositing it at the abutting surfaces of said lips and at the contacting surfaces of said lips and said sheets.

* * * * *